April 13, 1965  F. H. YONKER ETAL  3,177,595
TEACHING DEVICE
Filed Nov. 13, 1962
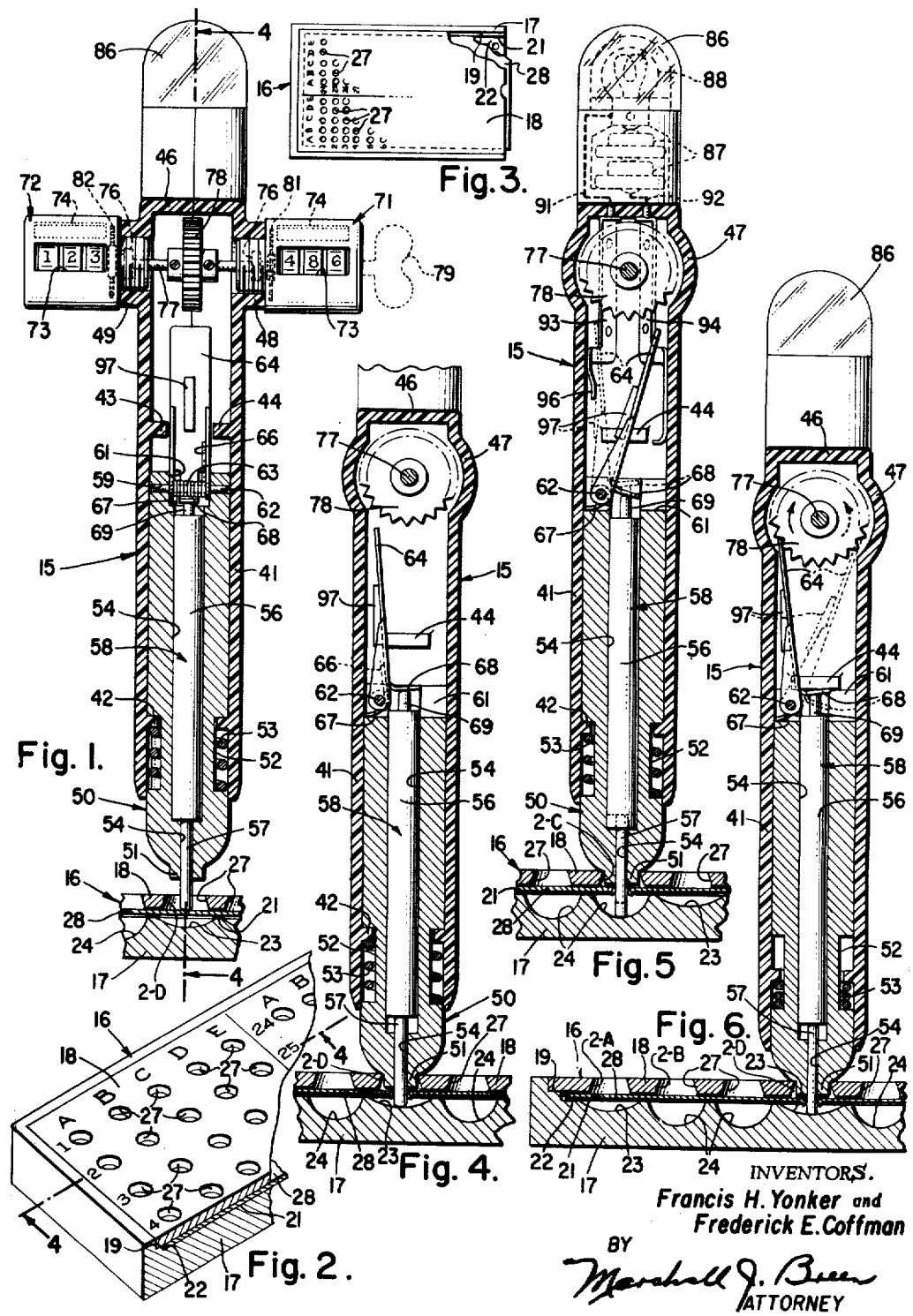
INVENTORS.
Francis H. Yonker and
Frederick E. Coffman
BY
ATTORNEY

United States Patent Office 3,177,595
Patented Apr. 13, 1965

3,177,595
TEACHING DEVICE
Francis H. Yonker and Frederick E. Coffman, State College, Pa., assignors to HRB-Singer, Inc., State College, Pa., a corporation of Delaware
Filed Nov. 13, 1962, Ser. No. 236,798
2 Claims. (Cl. 35—48)

This invention relates to teaching devices and more particularly to devices having a question board and a scoring probe, and the primary object of the present invention is to provide an improved device of this character.

Another object of the present invention is to provide an improved teaching device having means for recording the total number of correct and the total number of incorrect answers made to a plurality of multiple choice questions.

A further object of the present invention is to provide an improved teaching device having both a question board and a probe which when used together provide a convenient means for giving and checking the results of a quiz having a large number of questions.

A further object of the present invention is to provide an improved teaching device having means whereby a record sheet can be inserted into a question board in such a way that a permanent record is made of all answers.

A further object of the present invention is to provide an improved teaching device having a signalling device which will tell the pupil whenever a correct answer has been recorded. With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

FIG. 1 is an elevational view, partly in section, showing a teaching device, having both a question board and a probe, embodying the present invention.

FIG. 2 is a perspective view showing further details of the question board shown in FIG. 1, FIG. 3 is a reduced scale plan view of the question board shown in FIG. 2, FIG. 4 is a sectional view taken substantially on the line 4—4 of FIG. 1 and also in relation to the question board on a portion of the line 4—4 of FIG. 2 and showing the probe engaging a shallow or "correct" recess.

FIG. 5 is a view similar to FIG. 4, but showing the probe engaging a deep or "incorrect" recess, and FIG. 6 is a view similar to FIG. 4, but showing the operation of the counting mechanism.

The present invention is shown in accompanying drawings as comprising a probe 15 and a question board 16. The question board 16 is made up of a base member 17 and a cover member 18. The base member 17 is formed with a rabbet 19 which extends around three sides of the base member. The bottom surface of the rabbet 19 is slightly elevated above the main depressed upper surface 21 of the base member 17 and thus when the cover member 18 is positioned on the rabbet 19 there is formed a slot or cavity 22 between the lower surface of the cover member 17. The depressed surface 21 is formed with a plurality of shallow recesses 23 and with a plurality of deep recesses 24. The cover member 18 is formed with a plurality of identical holes 27, and it will be understood that each of the shallow recesses 23 and each of the deep recesses 24 is in register with one of the holes 27 when the cover member 18 is in position on the base member 17. The slot or cavity 22 permits insertion of an answer sheet or record paper 28 between the cover member 18 and the base member 17. Because the holes 27 are identical and because the record paper 28 covers both the shallow recesses 23 and the deep recesses 24, it would be impossible for a student to determine which holes 27 are in register with a shallow recess 23 and which holes 27 are in register with deep recesses 24. While not shown, it will be understood that the cover member 18 will be secured to the base member 17 so that the relative relationship of the holes 27 to the shallow recesses 23 and to the deep recesses 24 cannot be changed.

The probe 15 comprises a hollow cylindrical main insulating body 41 having an internal abutment collar 42, a pair of internal abutment lugs 43 and 44, a substantially closed upper end 46, a pair of cylindrical bulges 47 and two internally threaded cylindrical collars 48 and 49. The main body 41 receives toward its lower end a plunger 50 formed with a reduced diameter lower end 51 and with a cylindrical groove 52 adapted to accommodate the collar 42 and a helical compression spring 53. The plunger 50 is formed with a two-diameter central bore 54 designed to receive both the enlarged diameter portion 56 and the lower small or reduced diameter end portion 57 of a depth feeler rod 58. The upper end of the plunger 50 has a diametrical bore 59 and an enlarged end cavity 61 adapted to receive a pivot pin 62 around which is wound a biasing spring 63 and on which is pivotally mounted the lower end of a flip-flop lever 64, which lever 64 is normally biased by the spring 63 to the position shown by solid lines in FIG. 5. This last mentioned biasing of the lever 64 by the spring 63 is accomplished by reason of one end 66 of the spring 63 engaging the lever 64 and by the other end 67 of the spring 63 engaging a portion of the bottom of the cavity 61. The flip-flop lever 64 carries an arm 68 which is engaged by the upper reduced diameter end 69 of the feeler rod 58.

The collar 48 received an externally threaded portion of a counter 71, and the collar 49 received an externally threaded portion of a second counter 72. The counters 71 and 72, without invention, may be selected from counters shown in Veeder-Root Inc.'s catalog, Form No. 227687–7500-Rev. 7–61. Each counter 71 and 72 has a window 73 through which can be seen three digital dials and each counter is equipped with a part cylindrical window closing shield 74 which under some circumstances covers the digital dials. Each counter 71 and 72 also carries a bearing 76 which rotatably supports a shaft 77, to the center of which is secured a toothed wheel 78. Each counter 71 and 72 is provided with a key 79 by use of which the shields 74 can be moved to permit reading the score on the counter. Also the key 79 can be used to reset the digital wheels to zero. The right end (FIG. 1) of the shaft 77 is connected through a one-way clutch 81 to the digital wheels of the counter 71. In like manner, the left end of the shaft 77 is connected through a one-way clutch 82 to the digital wheels of the counter 72. The clutches 81 and 82 may be constructed according to the one-way clutches shown in the now expired U.S. Patent No. 2,272,169 issued February 10, 1942 to A. J. Granberg or if desired, the counters 71 and 72 may be of the type designated in the Veeder-Root catalog, supra, as Series 1144 ratchet counter wherein counters and ratchet clutches are provided in one small square case.

Above the upper end 46 there is optionally positioned a cap 86 which houses a dry cell battery 87, a lamp bulb 88, and a pair of electrical conductors 91 and 92. The lower ends of conductors 91 and 92 are respectively connected to the upper ends of bus bars 93 and 94. In a manner presently to be more fully explained, the lower end of the bus bar 94 may be engaged by the upper end of the metallic plunger 50 and thus becomes electrically connected to the lower end of the flip-flop lever 64. The lower end of the bus bar 93 carries a contact point 96 which may be engaged by a contact bar 97 carried by the flip-flop lever 64.

In using the subject teaching device, it will be understood that a large number of multiple choice test questions and answers will be formulated. Each of these test questions and answers will be similar to the following which comprises one question followed by five answers, some of which are "correct" and some of which are "incorrect." (Test Question #2): Which of the following cities are in Pennsylvania?

(A) Philadelphia
    (B) Trenton
    (C) Toledo
    (D) Pittsburgh
    (E) Buffalo It will also be understood that each answer will be keyed to either a shallow recess 23 or to a deep recess 24 according to which answer is correct or incorrect. For example, in FIGS. 2 and 6, holes 2–A and 2–D are shown associated with shallow or correct recesses 23, while holes 2–B, 2–C and 2–E are associated with deep or incorrect recesses 24.

If the student using the probe 15 thinks that Toledo is in Pennsylvania and places the reduced diameter lower end 51 of the plunger 50 into the hole 2–C (FIG. 5), the small end portion 57 of the depth feeler rod 58 will engage the bottom of the deep recess 24 without the rod 58 being moved with respect to the plunger 50. Because the rod 58 is not elevated the flip-flop lever 64 will remain biased to the incorrect registering position by the spring 63 which, as viewed in FIG. 5, is the clockwise position. This causes the upper end of the lever 64 to remain to the right of the shaft 77. On the other hand, of the student knows that Pittsburgh is in Pennsylvania and places the end 51 of the plunger 50 into the hole 2–D (FIG. 4) the small end portion 57 of the rod 58 in engaging the bottom of the shallow recess 23 will be moved upwardly with respect to the plunger 50. As the rod 58 is elevated the flip-flop lever 64 will turn counterclockwise against the bias of spring 63 to the position shown in FIG. 4. This causes the upper end of the lever 64 to move to a position to the left of the shaft 77.

When the student presses downwardly on the main body 41, the spring 53 is compressed, and the plunger 50 moves upwardly in the body 41. This causes the upper end of the flip-flop lever 64 to engage the periphery of the toothed wheel 78. If the upper end of the flip-flop lever 64 is to the left of the shaft 77 (see solid line position in FIGS. 4 and 6) the wheel 78 will be turned clockwise and because of the one-way clutches 81 and 82 only the "correct" counter 71 will count. If the upper end of the flip-flop lever 64 is to the right of the shaft 77 (see the solid line position in FIG. 5 and the dash-dash position in FIG. 6) the wheel 78 will be turned counterclockwise and because of the one-way clutches 81 and 82 only the "incorrect" counter 72 will count.

From the above, it can be seen that the probe 15 can count the total correct answers and the total incorrect answers made by the student. Because of the window closing shutters 74—74 the student need not know the total "correct" or "incorrect" answers until the instructor uses the key 79 to turn both shutters from their covering positions.

When the basic probe 15 is modified by the addition of the cap 86, the lamp bulb 88, the battery 87 and the circuit elements 91, 92, 93, 94, 96 and 97, the student can immediately be informed when a "correct" answer is achieved. This operates as follows. When a shallow "correct" recess 23 is engaged by the end of the small portion 57 and thereby moves the flip-flop lever 64 to the dash-dash position shown in FIG. 5, the bar 97 engages the contact 96 to complete a circuit from the contact 96, through the bus bar 93, the conductor 91, the lamp bulb 88, the battery 87, the conductor 92, the bus bar 94, the plunger 50, the pivot pin 62, the flip-flop lever 64, and the bar 97. This of course illuminates the lamp bulb 88 every time a "correct" answer is counted by the counter 71.

As an additional feature, the instructor can allow only the incorrect counter 72 to be covered by the shutter 74. This action would permit the student to try each choice of a given question until he receives an increase on the "correct" counter 71. In this type of testing the student will always learn the correct answer to each question and in addition the instructor will learn how smart the student is by the number of "incorrect" choices required to discern the correct answer.

Having thus set forth the nature of this invention, what we claim herein is:

1. A teaching device comprising in combination a question board and a probe, said probe comprising a substantially cylindrical hollow insulated main body, an abutment collar formed internally of said main body, a cylindrical plunger having a two-diameter longitudinal bore and an external cylindrical groove, a helical compression spring housed in the groove of said plunger and one end of said spring engaging the collar of said main body, a depth feeler rod slidably positioned in the bore of said plunger, a flip-flop lever pivotally mounted on said plunger, biasing means biasing said lever in a direction to engage the upper end of said feeler rod, a shaft mounted on said main body, a toothed wheel secured to said shaft and selectively engageable by the free end of said flip-flop lever, a pair of oppositely turnable one-way clutches driven by said shaft, and a digital counter driven by each of said one way clutches.

2. A teaching device comprising in combination a question board and a probe, said probe comprising a main body, a plunger slidably mounted in said main body and biased to protrude from one end of said main body, a depth feeler rod slidably mounted in said plunger, a flip-flop lever pivotally mounted on said plunger, biasing means engaging said plunger and said flip-flop lever and biasing said flip-flop lever in a predetermined direction, an arm carried by said flip-flop lever and engaging the upper end of said feeler rod, a wheel turnably mounted on said main body, said flip-flop lever turning said wheel in one direction when said feeler rod is in one position and said flip-flop lever turning said wheel in the opposite direction when said feeler rod is in another position, and at least one recording device driven by said wheel.

References Cited in the file of this patent

UNITED STATES PATENTS

| | | |
|---|---|---|
| 1,659,901 | Winquist | Feb. 21, 1928 |
| 1,841,951 | Hopper | Jan. 19, 1932 |
| 2,546,666 | Fliescher | Mar. 27, 1951 |
| 2,889,634 | Bringmann | June 9, 1959 |
| 2,943,400 | Griswold | July 5, 1960 |
| 2,970,385 | Bringmann | Feb. 7, 1961 |
| 3,057,082 | Wellington et al. | Oct. 9, 1962 |

UNITED STATES PATENT OFFICE
CERTIFICATE OF CORRECTION

Patent No. 3,177,595

April 13, 1965

Francis H. Yonker et al.

It is hereby certified that error appears in the above numbered patent requiring correction and that the said Letters Patent should read as corrected below.

Column 1, line 63, before "17" insert -- 18 and the depressed upper surface 21 of the base member --; column 3, line 34, for "of" read -- if --.

Signed and sealed this 24th day of August 1965.

(SEAL)
Attest:

ERNEST W. SWIDER
Attesting Officer

EDWARD J. BRENNER
Commissioner of Patents